July 30, 1968     W. A. HYLAND     3,394,668
STRAW WALKERS FOR GRAIN DRILLS
Filed Feb. 15, 1965     2 Sheets-Sheet 1
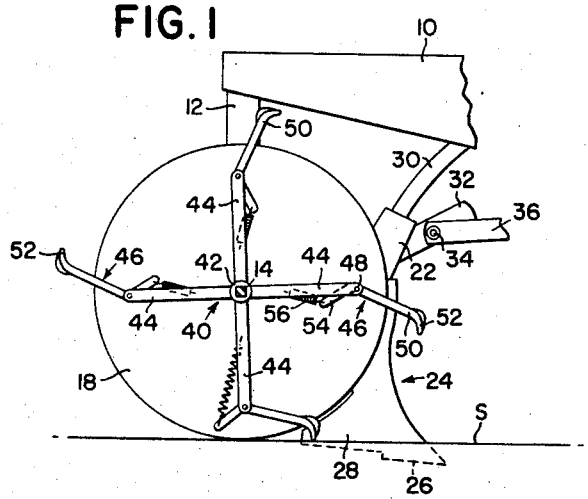
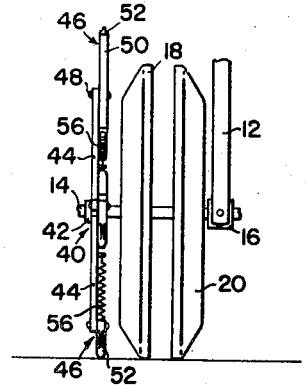
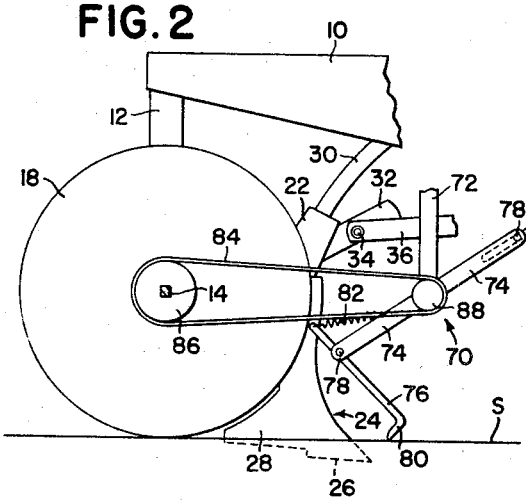
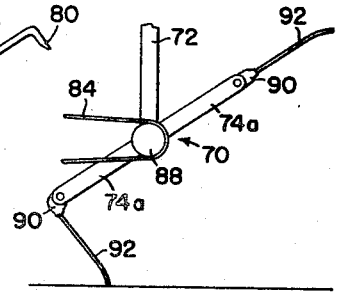
*INVENTOR.*
WILLIAM A. HYLAND
BY
*John C. Thompson*
ATTORNEY July 30, 1968  W. A. HYLAND  3,394,668
STRAW WALKERS FOR GRAIN DRILLS
Filed Feb. 15, 1965  2 Sheets-Sheet 2

INVENTOR.
WILLIAM A. HYLAND
BY
*John C. Thompson*
ATTORNEY

United States Patent Office 3,394,668
Patented July 30, 1968

3,394,668
STRAW WALKERS FOR GRAIN DRILLS
William A. Hyland, Horicon, Wis., assignor to Deere &
Company, Moline, Ill., a corporation of Delaware
Filed Feb. 15, 1965, Ser. No. 432,794
2 Claims. (Cl. 111—85)

ABSTRACT OF THE DISCLOSURE

A straw walker for a grain drill having a plurality of press wheels in which the straw or trash walker will get the trash upon the ground to move up to the point where the press wheel of the grain drill can get ahold of it and pull it through the grain drill.

---

The present invention relates generally to agricultural implements, and more particularly to planting implements such as grain drills and the like.

An object of the present invention is to provide a straw walker for a grain drill having a plurality of press wheels in which the straw or trash walker will get the trash upon the ground to move up to the point where the press wheel of the grain drill can get ahold of it and pull it through the grain drill. More particularly, it is an object of the present invention to provide a straw walker having yieldable ground-engaging means to engage the trash upon the ground and to move it towards the press wheels.

More particularly, it is an object of the present invention to provide a straw walker which is operably associated with the press wheels of a grain drill and so constructed and arranged that the yieldable ground-engaging surfaces of the straw walker at least occasionally project forwardly of the press wheels and engage the ground and any trash thereon to bring the trash toward said press wheels.

Another object of the present invention is to provide a straw walker which is rotatable with the press wheels and mounted concentrically therewith, the straw walker having a plurality of yieldable ground-engaging means projecting outwardly beyond the radially outer edge of the press wheels.

Another object of the present invention is to provide a straw walker which is rotatably mounted in front of the press wheels of an associated grain drill, said straw walker having a plurality of resilient ground-engaging means engageable with the surface of the ground in front of the press wheels and adapted to bring trash on the ground toward the press wheels.

A further object of the present invention is to provide a straw walker in which a rotary flail is mounted in front of the press wheels of a grain drill, the rotary flail being provided with ground-engaging surfaces that contact the trash upon the ground and move it toward the press wheels of the associated grain drill.

A further object of the present invention is to provide a straw walker having a plurality of ground-engaging means mounted upon an endless flexible conveyor, said conveyor being mounted in such a fashion that the ground-engaging means will move trash upon the ground toward the press wheels.

These and other objects and advantages of the present invention will be apparent to those skilled in the art after a consideration of the following detailed description, taken in conjunction with the accompanying drawings in which the preferred forms of this invention are illustrated.

FIG. 1 is a side view of a portion of a grain drill in which a straw walker of an improved design has been mounted concentrically with the press wheels of the grain drill.

FIG. 1a is a partial front view of the grain drill shown in FIG. 1.

FIG. 2 illustrates a form of straw walker in which the straw walker is rotatably mounted in front of the press wheels and is provided with spring biased ground-engaging elements.

FIG. 2a is a partial side view of a straw walker generally similar to that shown in FIG. 2, in which the ground-engaging means are resiliently mounted in elastomeric material.

Figure 3:
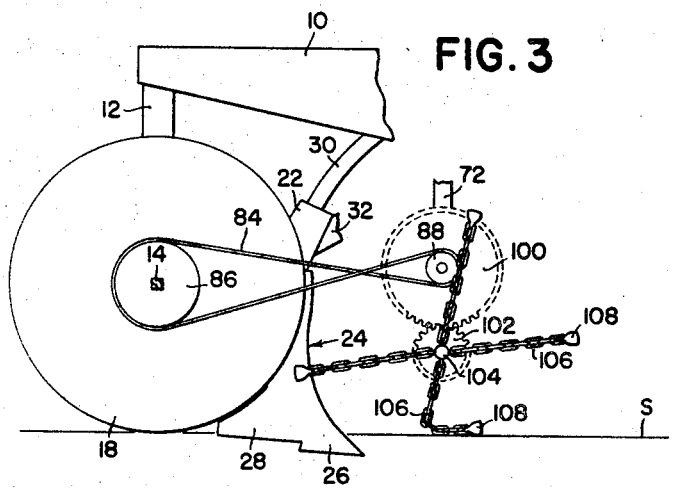
FIG. 3 illustrates a form of straw walker in which the ground-engaging elements are mounted at the ends of flexible chains.

The grain drill on which the present invention is adapted to be mounted is provided with a frame indicated at 10. A generally vertical standard 12 is rigidly secured at its upper end to the frame 10 and rotatably carries an axle 14 in bearings 16 at its lower end. A plurality of pairs of press wheels 18 and 20 are mounted fixedly on the transverse axle 14.

The press wheels 18 and 20 of each pair are spaced apart an amount to receive a relatively narrow seed boot 22 which carries at its lower end a furrow opener indicated generally at 24. Each furrow opener includes a shovel 26 and rearwardly extending closely spaced apart plates 28. The boot 22 is constructed to receive at its upper end a flexible seed tube 30 that extends downwardly from a seed hopper (not shown) carried by the frame 10. The seed boot 22 is provided with a forward arm 32 that is pivoted as at 34 to the rear end of an associated drag bar 36. The foregoing grain drill is more fully described in U.S. Patent 3,180,291 to Robert E. Loomans, issued Apr. 27, 1965 (now Ser. No. 343,804).

One form of applicant's improved straw walker, as shown in FIGS. 1 and 1a, includes a cruciform mounting member or spider indicated generally at 40 having a hub-portion 42 secured to the axle 14 for rotation therewith, the spider also including outwardly projecting legs 44. Bell crank members 46 are pivotally secured as at 48 to the outer ends of the associated outwardly extending legs, and the normally outwardly projecting arm 50 of each bell crank is provided with a ground-engaging portion 52. The inner arm 54 is apertured at its outer end and receives one end of a spring 56, the inner end of the spring being secured to an inward portion of the outwardly projecting leg 44.

In operation, as the grain drill is propelled forwardly over the field, the press wheels 18 and 20 will be caused to rotate in a clockwise manner, when viewed as in FIG. 1. The axle 14, which is secured to the press wheels for rotation therewith, will cause the ground-engaging portions 52 of the bell cranks, which are carried by the outer ends of the legs of the spider, to rotate with the axle. The outer ends of the bell cranks extend well beyond the outer periphery of the press wheel and will engage any trash forward of the press wheel and bring it in towards the press wheel. As the ground-engaging portion 52 engages the surface S of the ground, the portion 52 can swing towards the periphery 58 of the press wheels, against the action of the tension spring 56.

In the form of straw walker illustrated in FIG. 2, a rotary member, indicated generally at 70, is mounted forwardly of the furrow opener 24 by means of a bracket 72 extending downwardly from the frame 10 of the grain drill, to which the bracket is rigidly secured. The rotary member 70 is provided with a plurality of rigid radially outwardly extending legs 74. A link 76 is pivoted at 78 to the outer end of the outwardly projecting arm 74, and is provided with a ground-engaging surface 80. A tension spring 82 normally holds the ground-engaging surface outwardly but permits resiliently yielding movement of the surface 80 inwardly when the surface comes into contact with the surface of the ground S. The rotary member is driven by means of a belt 84 which is mounted about a sheave 86 that is secured to the axle 14 and is adapted to rotate therewith, and also with a sheave 88 that is rotatably carried by the bracket 72 and is adapted to rotate with the rotary member 70. The sheaves are so sized with respect to each other that the ground-engaging means 80 will rotate at a speed faster than ground speed.

In the modification shown in FIG. 2a, the outwardly extending legs 74a have secured at their outer ends a block of elastomer material 90. The inner end of a tine 92 is secured within the block of elastomer material for resilient movement, and the outer end of the tine is provided with a ground-engaging surface. The tine and block of elastomer material may be generally in the form shown in the U.S. patent to Gustafson No. 3,065,591, issued Nov. 27, 1962.

The form of this invention illustrated in FIG. 3 is generally similar to that shown in FIG. 2 in that a rotary member is carried forwardly of the press wheels and furrow opener by means of a bracket 72. According to this form of the invention, a chain-type flail is rotated at a speed sufficiently high that the weights carried by the outer ends of the flail contact the surface of the ground and carry trash lying upon the surface S of the ground towards the press wheels 18 and 20. Thus a gear 100 is mounted concentrically with the sheave 88 for rotation therewith, and a pinion is rotatably mounted on an extension of the bracket 72 and is in mesh with the gear 100. The pinion in turn carries a hub 104 to which radially outwardly extending chains 106 are secured, the chains in turn carrying at their outer ends ground-engaging weights 108. The belt and gear drives are so dimensioned that when the grain drill is propelled forwardly at the normal drilling speed, the weights 108 will extend the chains radially outwardly due to the centrifugal force developed, and yet the chains will permit the weights to be dragged along the surface of the ground as is clearly illustrated in FIG. 3.

Figure 4:
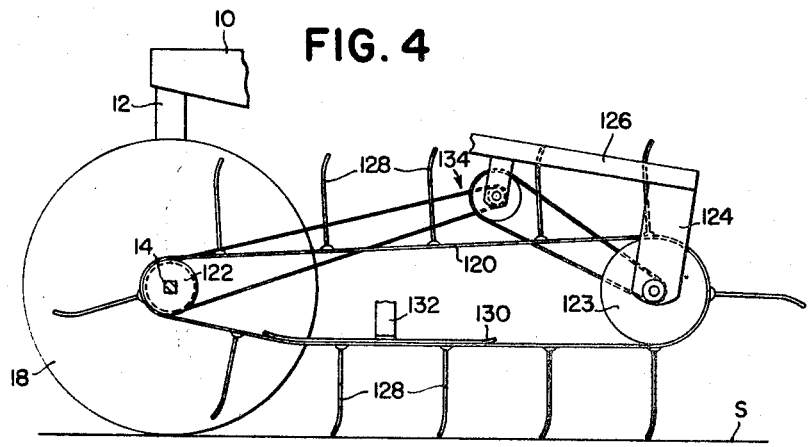
FIG. 4 illustrates a form of straw walker in which the ground-engaging elements are yieldably mounted upon an endless flexible conveyor type element, one end of the conveyor being mounted forwardly of the press wheels.

In the modification shown in FIG. 4, an endless flexible chain or belt 120 is mounted with its rear end disposed about a rotatable wheel 122 that is journaled for rotation upon the axle 14, the forward end of the member 120 being disposed over a wheel 123 that is rotatably carried by a downwardly extending bracket 124 which is in turn rigidly secured to a brace 126 whose rear end is rigidly secured to the frame 10 of the grain drill. A plurality of outwardly extending tines 128 are mounted on the member 120 in such a fashion that they may yield when they come into contact with an obstruction upon the surface S of the ground, the tines normally being held in contact with ground surface by means of a platen 130 carried by a bar 132 whose upper end is also rigidly secured to the frame 10 of the grain drill. The wheel 123 is caused to be rotated by means of belt drives indicated generally at 134, the belts and sheaves being so sized relative to each other that the speed of the tines is slightly faster than ground speed.

While the preferred structures in which the principles of the present invention have been incorporated are shown and described above, it is to be understood that the invention is not to be limited to the particular details, shown and described above, but that, in fact, widely different means may be employed in the practice of the broader aspects of the invention.

What is claimed is:

1. In a grain drill having a furrow opener means and a plurality of press wheel means mounted on a rotatable axle to the rear of the furrow opener means, the combination therewith of a straw walker comprising: spider means having a hub and outwardly projecting legs, said spider means being mounted between adjacent press wheel means on said axle and rotatable therewith, bell crank members pivotally secured to the outer ends of each of said legs, each of said bell crank members having a pair of arms, one of said arms of each bell crank normally extending well beyond the outer periphery of the press wheel means and having ground-engaging means on the outer end thereof, and resilient means associated with each of said bell cranks operable to normally hold each of said one arms in its extended position but yieldable when the ground-engaging means contacts the earth during rotation of the press wheel means to permit the ground-engaging means to move along the surface of the ground toward the periphery of the press wheel means as it engages the trash upon the ground and moves it towards the press wheel.

2. The grain drill set forth in claim 1 in which each of said resilient means indicates a tension spring, one end of which is secured to a leg and the other end of which is secured to the other arm of the associated bell crank.

References Cited

UNITED STATES PATENTS

| | | | |
|---|---|---|---|
| 216,471 | 6/1879 | Tanner | 111—32 |
| 617,454 | 1/1899 | Whittier | 172—65 |
| 791,796 | 6/1905 | Jones | 111—32 |
| 1,050,923 | 1/1913 | De Viese | 172—96 X |
| 2,267,854 | 12/1941 | Boyan et al. | 111—32 |
| 3,180,291 | 4/1965 | Loomans | 111—85 |

FOREIGN PATENTS

| | | |
|---|---|---|
| 75,846 | 3/1918 | Switzerland. |

ABRAHAM G. STONE, *Primary Examiner.*

A. E. KOPECKI, *Assistant Examiner.*